W. GRIKSCHEIT.
VEHICLE WHEEL RIM.
APPLICATION FILED SEPT. 16, 1918.
1,348,137. Patented July 27, 1920.
2 SHEETS—SHEET 1.
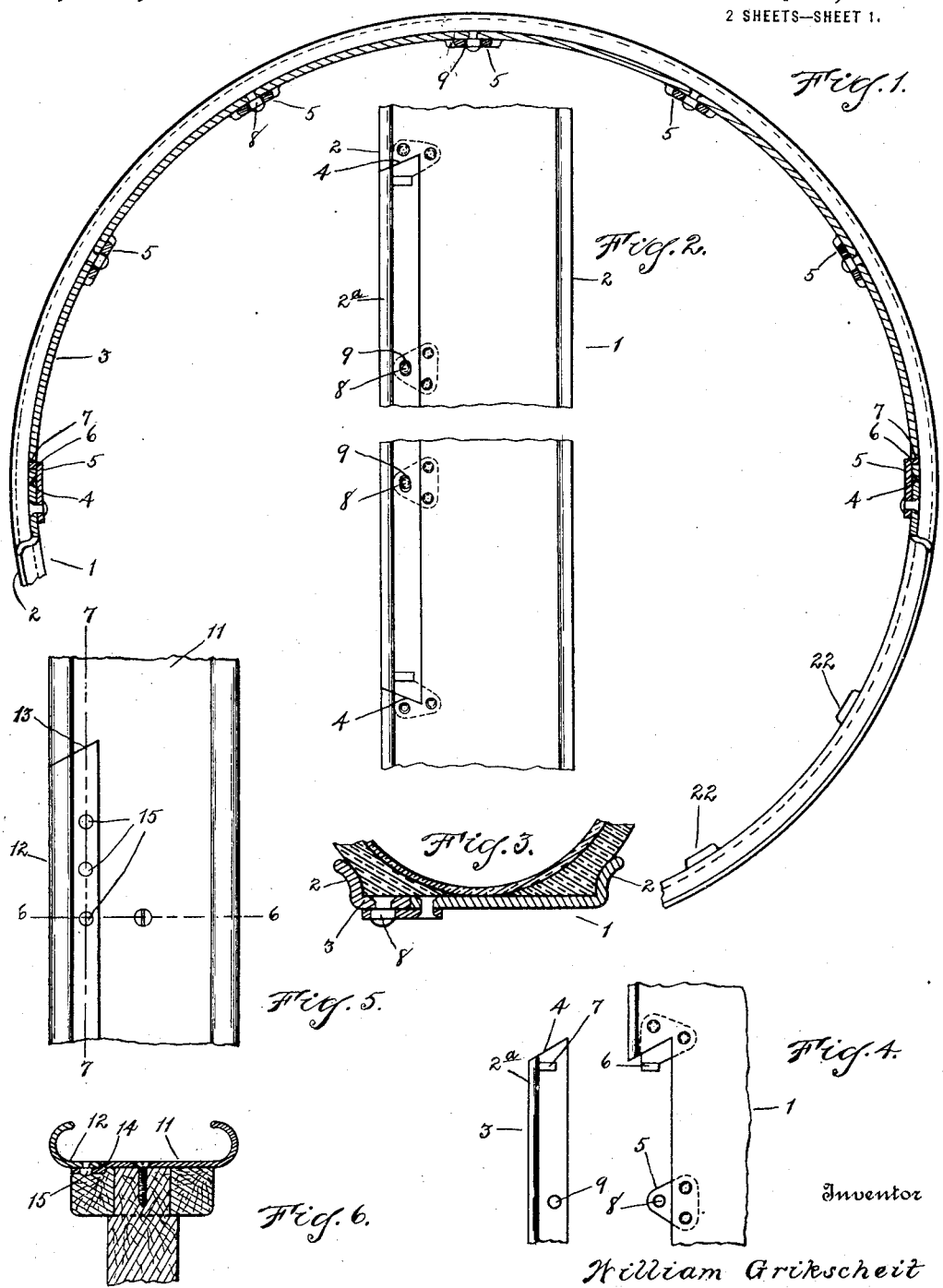
Inventor
William Grikscheit
By Whittemore, Hulbert & Whittemore.
Attorneys W. GRIKSCHEIT.
VEHICLE WHEEL RIM.
APPLICATION FILED SEPT. 16, 1918.
1,348,137.
Patented July 27, 1920.
2 SHEETS—SHEET 2.
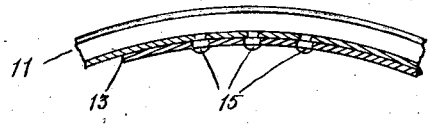
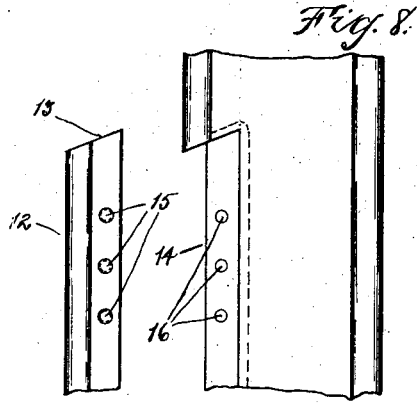
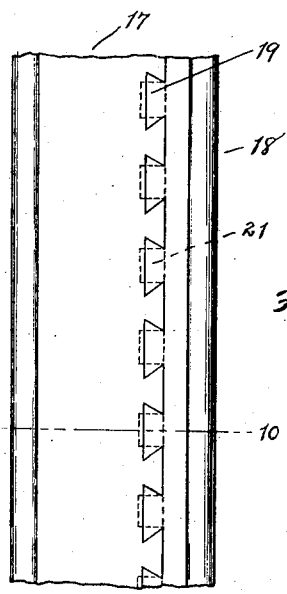
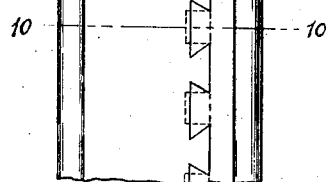
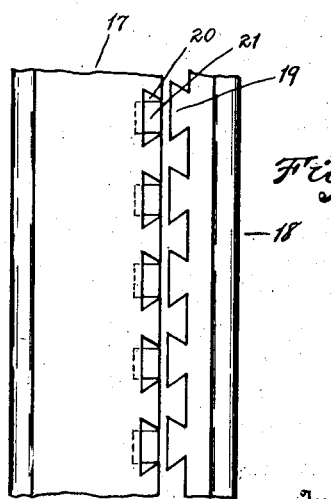
Inventor
William Grikscheit
By Whittemore Hulbert & Whittemore
Attorneys

UNITED STATES PATENT OFFICE.

WILLIAM GRIKSCHEIT, OF DETROIT, MICHIGAN.

VEHICLE-WHEEL RIM.

1,348,137. Specification of Letters Patent. Patented July 27, 1920.

Application filed September 16, 1918. Serial No. 254,196.

*To all whom it may concern:*

Be it known that I, WILLIAM GRIKSCHEIT, a citizen of the United States of America, residing at Detroit, in the county of Wayne and State of Michigan, have invented certain new and useful Improvements in Vehicle-Wheel Rims, of which the following is a specification, reference being had therein to the accompanying dawings.

This invention relates to rims and more particularly relates to rims of the type having a side portion removable to facilitate mounting and demounting of a tire. The invention consists in the novel means employed to hold the removable portion in place upon the rim proper and in certain details of construction and arrangements and combinations of parts as will more fully hereinafter appear.

In the accompanying drawings:

Figure 1 is a view of one embodiment of the invention partly in side elevation and partly in section;

Fig. 2 is an enlarged view of the tire-receiving face of said rim showing the engagement of the removable member therewith;

Fig. 3 is a cross sectional view taken on line 3—3 of Fig. 2;

Fig. 4 is a view similar to Fig. 2, but showing the removable member detached from the rim proper;

Fig. 5 is a view of the tire-receiving surface of a modified form of the invention, the removable member being disclosed in engagement with the rim proper;

Fig. 6 is a cross-sectional view taken on line 6—6 of Fig. 5;

Fig. 7 is a circumferential sectional view taken on line 7—7 of Fig. 5;

Fig. 8 is a view similar to Fig. 5, but showing the removable member detached from the rim proper;

Fig. 9 is a fragmentary view of the tread surface of another modification of the invention;

Fig. 10 is a cross-sectional view of the same taken on line 10—10 of Fig. 9;

Fig. 11 is a view similar to Fig. 9, but showing the removable member detached from the rim proper.

In these views the reference character 1 designates the rim of a vehicle wheel, said rim being formed with the usual integral tire-retaining flanges 2 at each side thereof. A circumferentially-extending portion 3 is detachable from the rim proper, said portion preferably extending through a semi-circumference and being at one side of the rim and having thereon a flange member $2^a$ forming a continuation of the flange 2 at the corresponding side of the rim. The extremities of the detachable member 3 have a dove-tailed engagement with the rim proper as is indicated at 4, the member 3 thus being restrained against lateral displacement. To form a seat for the detachable member, substantially triangular plates 5 are riveted to the rim proper at the extremities of the opening therein, which receives the member 3 and at a circumferentially spaced series of points bordering the edge of said opening. Each of the plates 5 has a portion projecting beneath the opening receiving the member 3, said portions jointly constituting a seat for said detachable member. The end members 5 are formed with radially-projecting rectangular lugs 6 adapted to be inserted in similarly shaped openings 7 in the end portions of the member 3. Each of the intermediately disposed plates 5 is formed with a radially-projecting pin 8 adapted to be inserted in an opening 9 in the member 3, the openings 9 being slightly elongated circumferentially of the rim to allow a slight circumferential play of said member 3, whereby it may be engaged with the lugs 6 after the pins 8 have been inserted in said openings 9. The orifice 10 for the valve stem of the tire is located preferably in the rim proper at a point diametrically opposite the center of the removable member 3 so that in demounting a tire, the portion thereof normally engaging the detachable member 3 may first be displaced from the rim proper and the valve stem then removed from said orifice, while in mounting a tire, the stem may be inserted in said orifice and the opposite portion then placed upon the portion of the rim proper from which the member 3 has been detached.

In the modified form of the invention disclosed in Figs. 5 to 8 inclusive the reference character 11 designates the rim proper, and 12 a detachable side portion which has a dove-tailed engagement with the rim proper at 13 similar to the construction first described. Instead of providing spaced seats for the detachable member 12, however, a continuous seat therefor is formed by offsetting a portion 14 of the rim proper slightly toward the center of the wheel so that the detachable member 12 may seat upon said edge 14 in a flush relation to the rim proper. A series of circumferentially spaced rivets 15 is carried by the member 12, which rivets are flush with the outer surface of said member, but have semi-spherically projecting heads 15 projecting beyond the inner face of said member, said heads being insertible in openings 16 formed in the seat 14, the engagement of said heads with said seat coacting with the dove-tailed connection at the ends of the detachable member to restrain said member against lateral yielding.

In the third modification of the invention, which is disclosed in Figs. 9, 10 and 11, the rim proper is indicated at 17 and the detachable side portion at 18. In this construction a series of dove-tailed interlocks is formed by projections 19 upon the member 18 entering openings 20 formed in the member 17, and a seat for the detachable member 18 is formed by a series of lugs 21 formed integrally with the rim 17 and offset therefrom to occupy positions underlying the members 19.

It is to be noted that in each of the modifications of the invention above described ample provision is made to prevent blowing-out of the detachable portion of the rim proper owing to the considerable pressure exerted thereupon by the tire when inflated. In the two forms of the invention as described, the connections between the removable members and the rim proper established by the pins 8 entering the openings 9 and by the rivets 15 entering the openings 16 serve to prevent the intermediate part of the detachable member from yielding laterally despite the restraint exerted upon the dove-tailed ends of said member, while in the third form of the invention, the continuous series of dove-tailed interlocks restrains the detachable member against yielding both terminally and intermediately.

It is a feature of each of the above-described rim constructions that the joint between the detachable section and the rim proper is not near the circumferential center line of the rim, so that the shoe or casing of a tire rather than the inner tube thereof will overlie the joint and there will be no possibility of the tube being pinched between the joined members of the rim.

It is also a feature of each embodiment of the invention that the fastening devices carried by the sectional portion of the rim are balanced by correspondingly located weights secured to or formed integral with the unbroken portion of the rim, this provision being further advantageous in giving the rim a symmetrical appearance. Thus in Fig. 1, several of these balancing projections are indicated at 22.

In engaging or disengaging the detachable member from the rim proper in any of the several modifications the detachable member may be sprung slightly to allow the necessary successive engagement of the circumferential series of interlocks.

What I claim as my invention is:

1. The combination with a rim proper, of a member circumferentially extending at one side of the rim proper and forming a detachable portion of the rim, the extremities of said member having a dove-tailed engagement with the rim proper, members carried by the rim proper adjacent the extremities of the detachable member engaging apertures respectively formed in said extremities, and members intermediately carried by the rim proper engaging circumferentially slotted apertures in the detachable member whereby said member is permitted a circumferential play to allow engagement of the end members subsequent to the engagement of the intermediate members.

2. The combination with an annular rim proper having an opening at one side thereof and a detachable rim section fitting in said opening, of a plurality of devices securing said section to the rim proper, and correspondingly located weights upon the unbroken portion of the rim proper counterbalancing said fastening devices.

3. The combination with a rim proper, of a member circumferentially extending at one side of the rim proper and forming a detachable portion of the rim, the extremities of said member having a dove-tailed engagement with the rim proper, and means intermediately and terminally interengaging the detachable member and rim proper, the intermediate means permitting a relative circumferential play to allow subsequent engagement of the terminal means.

In testimony whereof I affix my signature.

WILLIAM GRIKSCHEIT.